US006668216B2

(12) United States Patent
Mays

(10) Patent No.: US 6,668,216 B2
(45) Date of Patent: Dec. 23, 2003

(54) METHOD, APPARATUS AND SYSTEM FOR WIRELESS DATA COLLECTION AND COMMUNICATION FOR INTERCONNECTED MOBILE SYSTEMS, SUCH AS FOR RAILWAYS

(75) Inventor: Wesley M. Mays, Coppell, TX (US)

(73) Assignee: TC (Bermuda) License, Ltd., Hamilton (BM)

( * ) Notice: Subject to any disclaimer, the term of this patent is extended or adjusted under 35 U.S.C. 154(b) by 0 days.

(21) Appl. No.: 09/861,477

(22) Filed: May 18, 2001

(65) Prior Publication Data

US 2002/0049520 A1 Apr. 25, 2002

Related U.S. Application Data

(60) Provisional application No. 60/205,782, filed on May 19, 2000.

(51) Int. Cl.[7] .......................... H04M 11/00; B60L 1/00

(52) U.S. Cl. ......................... 701/19; 246/167; 340/438; 340/536; 340/825.06; 340/310 A; 340/310 R; 340/538

(58) Field of Search ............................ 701/19, 36, 70; 246/167, 187, 120; 340/438, 536, 538, 933, 825.05, 825.34, 310 A, 310 R

(56) References Cited

U.S. PATENT DOCUMENTS 4,582,280 A 4/1986 Nichols et al. ......... 246/182 R
4,728,955 A 3/1988 Hane .......................... 342/140
5,039,038 A 8/1991 Nichols et al. ................ 246/3
5,117,096 A 5/1992 Bauer et al. ................ 235/375
5,142,278 A * 8/1992 Moallemi et al. ...... 340/825.06
5,274,343 A 12/1993 Russell et al. .............. 333/103
5,310,999 A 5/1994 Claus et al. ................ 235/384
5,382,784 A 1/1995 Eberhardt .................. 235/472
5,422,931 A 6/1995 Austin-Lazarus et al. ..... 379/59
5,440,315 A 8/1995 Wright et al. ............... 343/702
5,536,924 A 7/1996 Ackley ....................... 235/454
5,541,581 A 7/1996 Trent ..................... 340/825.31
5,548,106 A 8/1996 Liang et al. ................ 235/454

(List continued on next page.)

FOREIGN PATENT DOCUMENTS

FR 2760209 A1 9/1998
JP 10-40329 2/1998

OTHER PUBLICATIONS

"EPX™ Direct Braking and TrainTalk™," *Whitepaper*, GE HARRIS Railway Electronics.

(List continued on next page.)

*Primary Examiner*—Thomas G. Black
*Assistant Examiner*—Tuan C To
(74) *Attorney, Agent, or Firm*—Blank Rome LLP

(57) ABSTRACT

A system and method for automated, wireless short-range data collection and communications for interconnected mobile systems, such as trains includes a master control unit and a plurality of data transmission units communicating in a daisy-chain fashion along the collection of interconnected mobile systems. The master control unit can verify collected data and serve as an interface with an external communications system for providing real-time data to a central control site, for example via wayside readers, satellite communications, cell phone linkage, 2-way radio, etc. Data could include sensor information, railcar identification, status, trouble spots, location, and warnings.

24 Claims, 4 Drawing Sheets

U.S. PATENT DOCUMENTS

| | | | | | |
|---|---|---|---|---|---|
| 5,592,408 | A | | 1/1997 | Keskin et al. | 365/52 |
| 5,625,349 | A | | 4/1997 | Disbrow et al. | 340/825.31 |
| 5,629,981 | A | | 5/1997 | Nerlikar | 380/25 |
| 5,659,431 | A | | 8/1997 | Ackley | 359/798 |
| 5,681,015 | A | | 10/1997 | Kull | 246/187 |
| 5,722,736 | A | | 3/1998 | Cook | 303/15 |
| 5,737,710 | A | | 4/1998 | Anthonyson | 701/1 |
| 5,745,044 | A | | 4/1998 | Hyatt, Jr. et al. | 340/825.31 |
| 5,777,547 | A | * | 7/1998 | Waldrop | 340/438 |
| 5,813,635 | A | * | 9/1998 | Fernandez | 246/168 |
| 5,874,902 | A | | 2/1999 | Heinrich et al. | 340/825.54 |
| 5,959,568 | A | | 9/1999 | Woolley | 342/42 |
| 6,056,199 | A | | 5/2000 | Wiklof et al. | 235/462.45 |
| 6,184,798 | B1 | * | 2/2001 | Egri | 340/870.13 |
| 6,216,985 | B1 | * | 4/2001 | Stephens | 246/120 |
| 6,275,165 | B1 | * | 8/2001 | Bezos | 340/825.06 |
| 6,400,281 | B1 | * | 6/2002 | Darby, Jr. et al. | 340/933 |
| 6,401,015 | B1 | * | 6/2002 | Stewart et al. | 701/19 |

OTHER PUBLICATIONS

"TrainTalk™," GE HARRIS Railway Electronics.

"TrainTalk™ Wirefree Communications System: A Robust Wireless Communications Specifically Designed for the Railroad Environment," presented to *High productivity Freight and ECP Brake in Europe*, European Rail Research Institute, Feb. 4–5, 1998.

* cited by examiner

METHOD, APPARATUS AND SYSTEM FOR WIRELESS DATA COLLECTION AND COMMUNICATION FOR INTERCONNECTED MOBILE SYSTEMS, SUCH AS FOR RAILWAYS

CROSS-REFERENCE TO RELATED APPLICATION

This application claims the benefit of U.S. Provisional Application No. 60/205,782 filed May 19, 2000.

TECHNICAL FIELD

The following disclosure relates generally to wireless data collection and communications methods, apparatus and systems for interconnected mobile systems, such as railways.

BACKGROUND OF THE INVENTION

TRAINTALK from GE Harris Railway Electronic is a wireless communications system that employs a spread spectrum direct sequence radio to provide communications between railway vehicles (i.e., locomotives and cars) forming a railway train. In its current configuration, the TRAINTALK system provides electronically controlled braking (ECB) with a railway train, although marketing materials indicate that future capability may include providing information about car status and cargo conditions. Railway companies appear reluctant to place braking under electronic control for a variety of reasons, such as the high cost of retrofitting associated with such a system. The TRAINTALK system employs a mesh typography, each vehicle coupled to at least two other vehicles, in each direction, to provide multiple paths between vehicles for routing addressed messages.

Some railway companies began implementing data collection in 1992 using Amtech's AVI products. While successful at collecting data, the AVI system did not provide the collected data to the railway in "real-time."

Communications technology, including communication infrastructure, has become more cost-effective and pervasive in the last five to eight years. With the widespread use of cellular phone systems, Global Positioning Systems, and even satellite communicators, real time communication with almost any location within the United States is a current possibility. Railways have not fully taken advantage of such communications technology, and do not generally track equipment and inventory in real-time. Real-time tracking of equipment and inventory may increase operating efficiency, prevent losses, assist in the building and dismantling of trains or other collections of interconnected vehicles, and/or otherwise provide useful scheduling data. A need exists for real-time data collection and reporting for interconnected mobile systems, such as railways.

SUMMARY OF THE INVENTION

In one aspect a system and method of automated wireless data collection and communications for interconnected mobile systems, such as railway trains, includes an internal or "intra-train" communications system having a master control unit ("MCU") carried by one of the interconnected vehicles and a number of data transmission units ("DTU") each carried by a respective one of the other interconnected vehicles. Communications between the interconnected vehicles takes place in a daisy-chain fashion, each interconnected vehicle communicating with immediately adjacent vehicles, and appending its own data to data previously collected from prior vehicles. The master control unit may serve as the start and the terminus of the communications daisy-chain, and can provide the collected information to an external communications component.

Thus, the automated wireless data collection and communications for interconnected mobile systems may include the means for providing real-time tracking data for each railcar in this country. The data could include specific information concerning the condition, load, and inventory of each railcar on a train.

DETAILED DESCRIPTION OF THE INVENTION

Wireless data collection methods, systems and techniques are described in detail herein. In the following description, numerous specific details are provided, such as specific dimensions, protocols, frequencies, etc. to provide a thorough understanding of, and enabling description for, embodiments of the invention. One skilled in the relevant art, however, will recognize that the invention can be practiced without one or more of the specific details or with other dimensions, protocols, frequencies, etc. In other instances, well-known structures or operations are not shown, or not described in detail, to avoid obscuring aspects of the invention.

Figure 1:
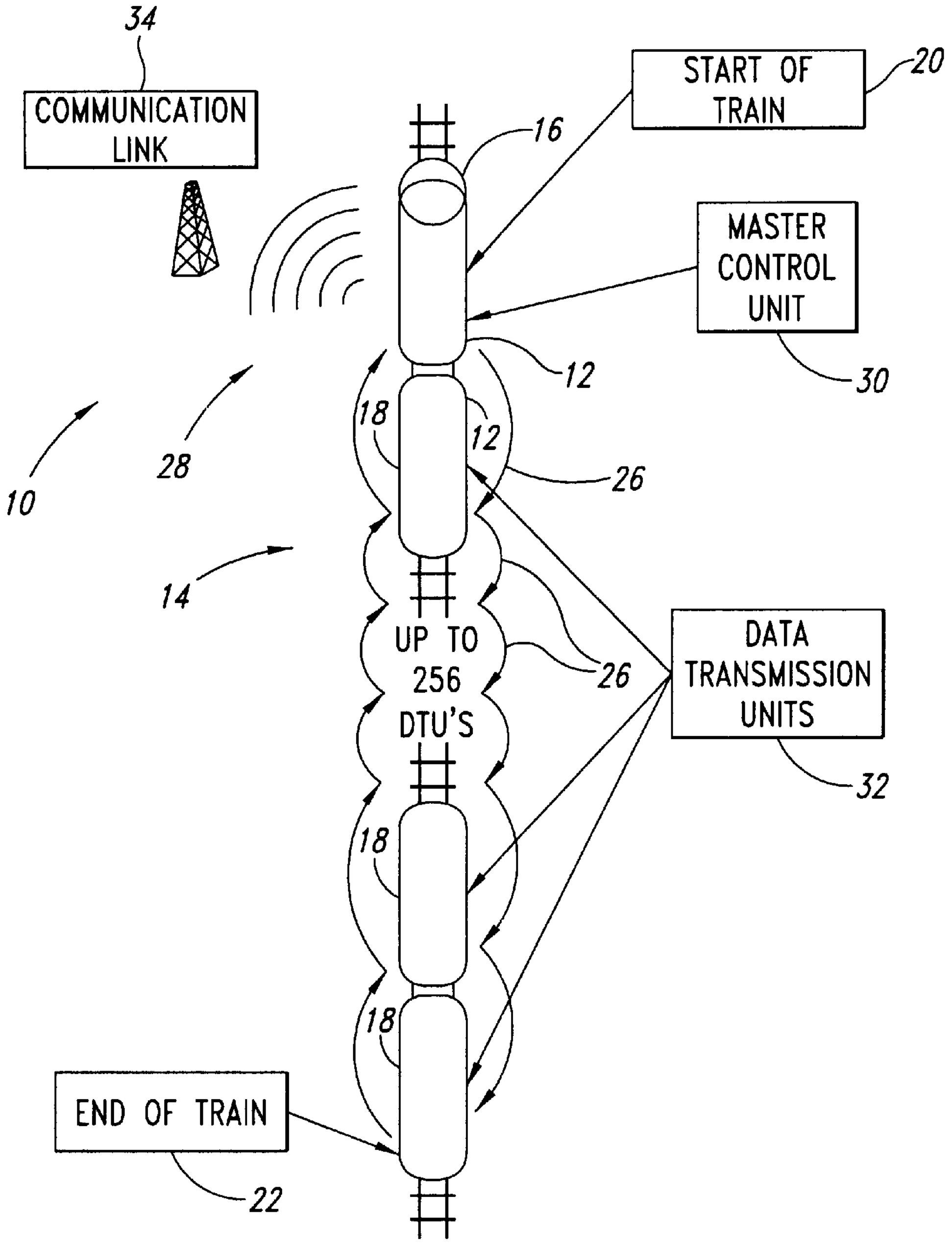
FIG. 1 is a schematic diagram showing an overview of an interconnected mobile systems data collection and communications system in the form of a railway communications system including an internal communications system carried by a plurality of railway vehicles forming a train and an external communications system.

FIG. 1 shows a wireless railway data collection and communications system 10 for collecting data from a number of railway vehicles 12 coupled serially together to form a train 14. The railway vehicles 12 can include one or more locomotives 16, and one or more cars 18. Typically, the locomotives 16 provide the power, pulling or pushing the cars 18. The locomotive 16 can be at a first end 20 of the train 14, as shown in FIG. 1. Alternatively, the locomotive 16 can be a second end 22 of the train, or can be between the first and the second ends 20, 22 of the train. Where the train includes more than one locomotive 16, the locomotives can be dispersed throughout the train.

The railway data collection and communications system 10 includes two subsystems, an intra-train communications system 26 for communicating between the railway vehicles 12 forming the train 14 and an external communications system 28 for communicating externally from the train 14. A master control unit 30 forms an interface between the intra-train communications systems 26 and the external communications system 28.

In addition to the master control unit 30, the intra-train communications system 26 includes a number of data transmission units 32. Each of the data transmission units is carried by a respective one of the railway vehicles 12, other than the railway vehicle carrying the master control unit 30. As shown in FIG. 1, each of the data transmission units 32 communicate with a data transmission unit 32 carried by the adjacent railway vehicle 12. Thus, the intra-train communications takes the form of a daisy-chain communications path between the various railway vehicles 12 forming the train 14. The daisy-chain communications path provides a lower cost alternative to a mesh topology, and provides more efficient routing of data since little or no addressing or other overhead is required. By employing a known block size, the master control unit 30 or the central control station can attribute the collected data to specific railway vehicles 12 using the identifier and/or the order of data with respect to the order of railway vehicles 12 in the train 14. Railways, which have thousands of locomotives and cars, require low infrastructure costs and high efficiency to deploy data collection and communications systems.

Typically, the master control unit 30 will be installed in a locomotive 16 at the first end 20 of the train, and a respective data transmission unit 32 will be installed in each of the other railway vehicles 12 of the train 14. However, it is possible to install the master control unit 30 at other positions in the train 14, still relying on the daisy-chain communications path between each of the adjacent railway vehicles 12 to collect data and relay data.

In addition to the master control unit 30, the external communications system 28 can include a communications link 24.

Figure 2:
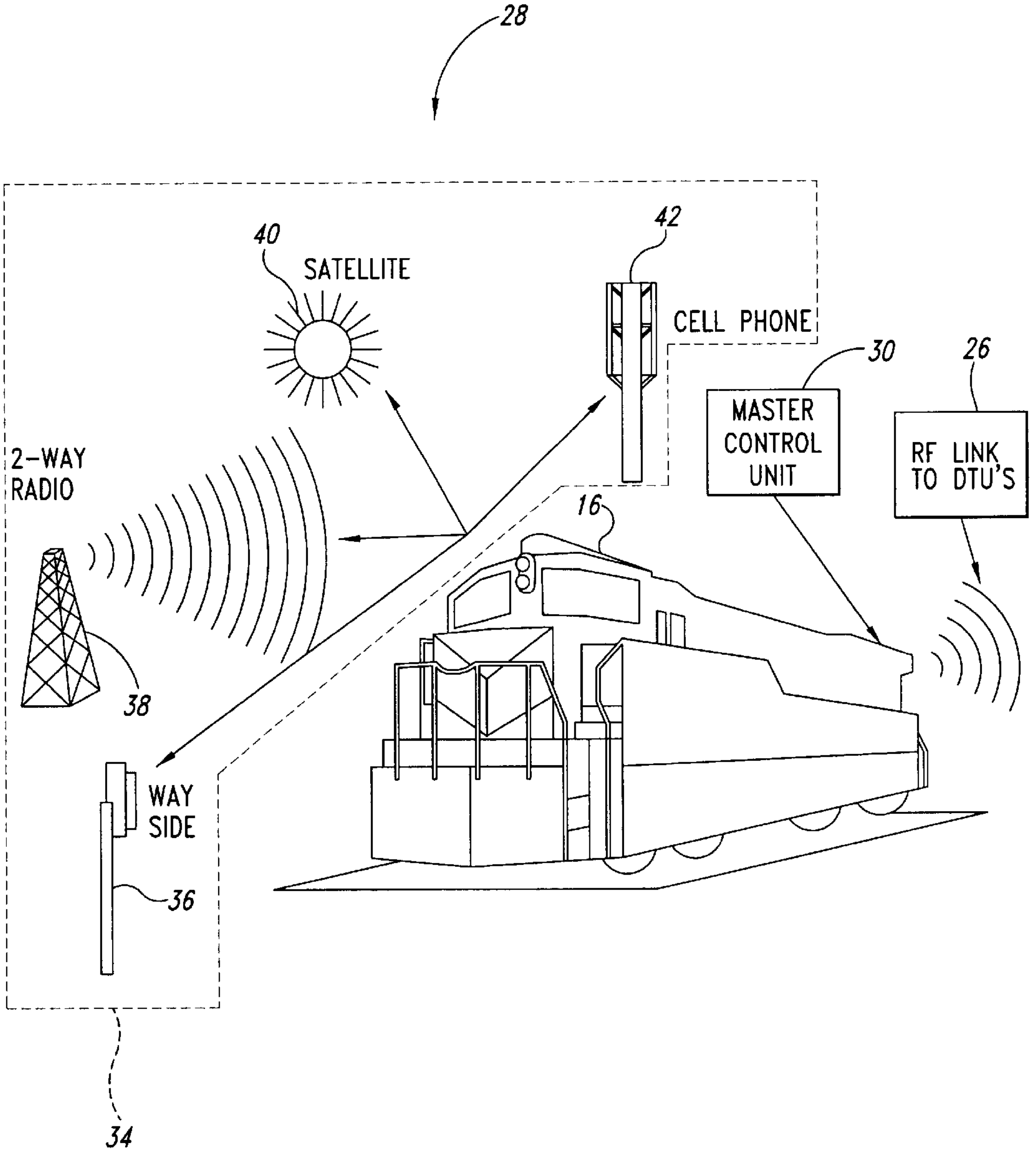
FIG. 2 is a schematic diagram of a portion of the railway communications system including a master control unit carried by a locomotive for collecting data from the plurality of railway vehicles forming the train of FIG. 1 and transmitting the collected data externally from the train.

FIG. 2 shows the interaction of the master control unit 30 carried by the locomotive 16 with the other components of the intra-train communications system 26 and the external communications system 28. The master control unit 30 serves as of the interface between the intra-train communications system 26 and the outside world. The master control unit 30 can initiate data collecting and monitor the daisy-chain communications path on the train 14. The master control unit 30 may employ existing communications infrastructure to provide real-time communications between the train 14 and the outside world. For example, the master control unit 30 may employ other components of the external communications system 28, such as a way side communications link 36, an AMTECH AVI interface, a 2-way radio interface 38, a satellite link 40 such as a global positioning system, and/or a cellular telephone interface 42.

Figure 3:
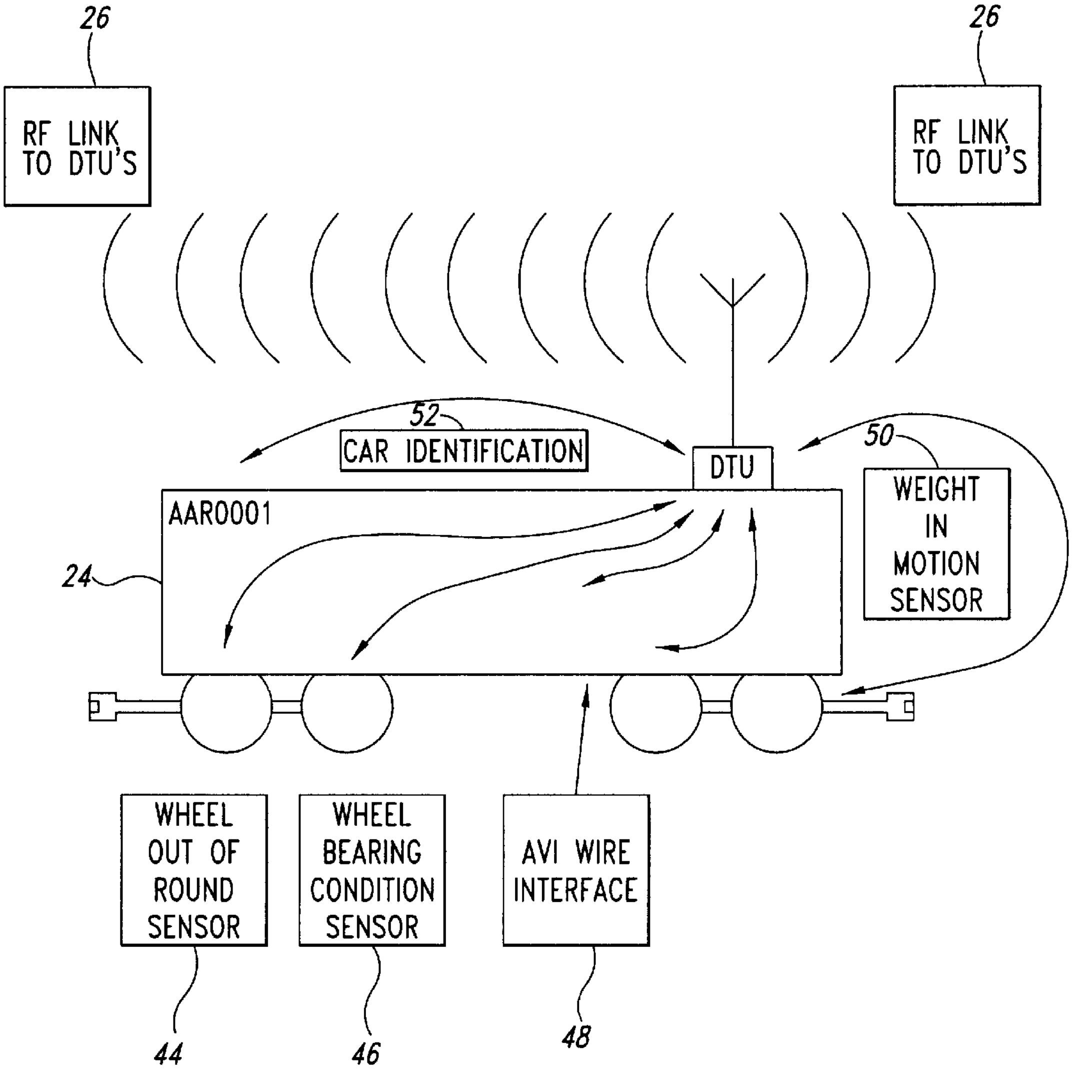
FIG. 3 is a schematic diagram of a portion of the railway communications system including a data transmission unit carried by each of the railway vehicles forming the train of FIG. 1.

FIG. 3 shows the interaction of the data transmission units 32 and some of the data transmission unit's data collection capabilities. The data transmission units 32 act as a transponder capable of operating in a master/slave configuration. One of the data transmission units 32 is typically mounted on each railway vehicle 12, although a separate data transmission unit 32 may be provided for each piece of high value cargo. The data transmission unit 32 has inputs for receiving data from sensors associated with the railway vehicle 12 and/or the railway vehicle cargo. For example, the data transmission unit 32 may receive data such as wheel out-of-round data from a wheel out-of-round sensor 44, wheel bearing condition data from a wheel bearing condition sensor 46, AVI collected data from an AMTECH AVI interface 48, weight in motion data from a weight in motion sensor 50 and/or car identification information 52.

Figure 4:
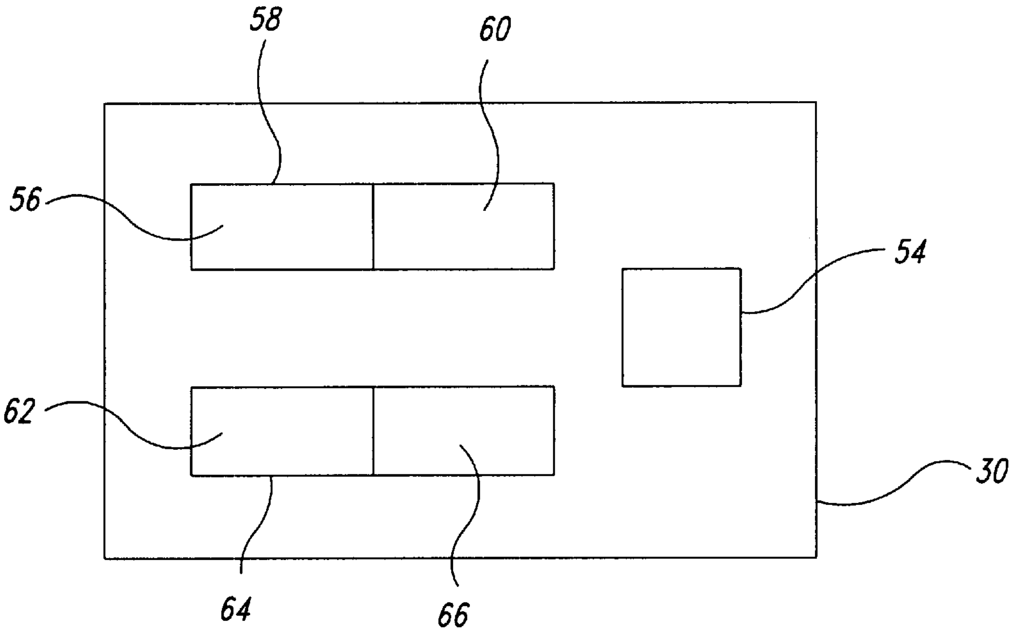
FIG. 4 is a functional block diagram of the master control unit.

FIG. 4 is a functional block diagram of the master control unit 30. The master control unit 30 includes a microprocessor 54 which may include an integral memory or can rely on a discrete memory (now shown) for instructions and data. The master control unit 30 also includes a short range transceiver 56 for providing intra-train communications with the data transmission units 32 on adjacent railway vehicles 12. The short range transceiver 56 includes a short range transmitter 58 and a short range receiver 60. The short range transceiver 56 may take the form of a radio frequency ("RF") transceiver. The master control unit also includes a long range transceiver 62 for providing communications externally from the train 14. The long range receiver 62 includes a long range transmitter 64 and a long range receiver 66. The long range transceiver 62 can take the form of one or more of a global position system transceiver, a 2-way radio transceiver, a cellular telephone transceiver, and/or a way side communications transceiver. The master control unit 30 may include, or may be coupled to one or more antennas (not shown) for providing suitable communications.

Figure 5:
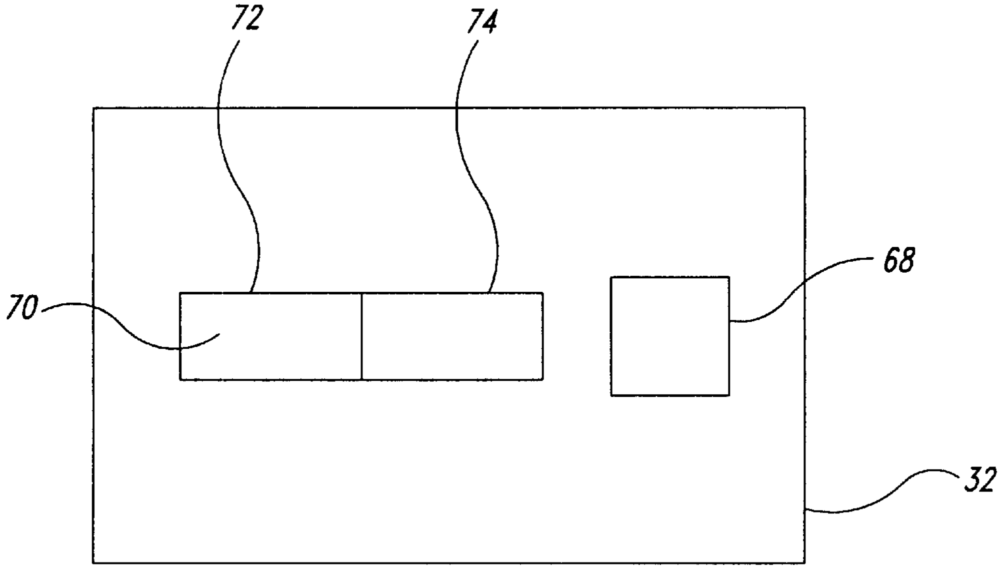
FIG. 5 is a functional block diagram of the data transmission unit.

FIG. 5 is a functional block diagram of the data transmission unit 32. The master control unit 32 includes a microprocessor 68. The microprocessor 68 can be similar to the microprocessor 54 of the master control unit 30, or can be a less powerful processor or controller since the data transmission units 32 have less of a processing burden than the master control unit 30. The data transmission unit 32 also includes, a short range transceiver 70 for providing intra-train communications with the data transmission units 32 on adjacent railway vehicles 12. The short range transceiver 70 includes a short range transmitter 72 and a short range receiver 74. The short range transceiver 70 can take the form of an RF transceiver. The data transmission unit 32 may include, or may be coupled to one or more antennas (not shown) for providing suitable communications.

Operation of the wireless data collection and communications system 10 will be described with reference to FIG. 1. The master control unit 30 may be programmed to query the train 14 at predetermined intervals, or upon command from a central control station relayed to the master control unit 30 via the communications link 34. The master control unit 30 initiates the vehicle query sending an RF signal to the "first" data transmission unit 32. The data transmission unit 32 then assume master control, appending the contents of its memory to the data string, querying for the "next" data transmission unit 32, and transferring master control to that next date transmission unit 32. The "first" data transmission unit 32 then enters into a "sleep but monitor" mode. The process would be serially repeated along the train 14 until all data transmission units 32 on the train 14 had appended their information to the data bus.

The "last" data transmission unit 32 on the train 14 could be configured as an end of train ("EOT") device. When all data transmission units 32 had responded, including the EOT data transmission unit, the data string would be echoed back up through each data transmission units 32 until it reached the master control unit 30. The master control unit 30 could compare previous data strings, pre-programmed vehicle count, or could simply process the data.

After the master control unit 30 confirmed the validity of the data, the master control unit 30 could establish an external communication link. The external communications link could be direct or indirect. A direct link could be established using a 2-way radio or cellular telephone transceiver to communicate with a central control station. An indirect link could be established with a wayside reader or a satellite communication link. The master control unit 30 could report on the location, time, and transfer all data collected during the interrogation process.

Background information and/or further details for certain aspects of the above embodiments may be found in U.S. Provisional Patent Application No. 60/205,782, filed May 19, 2000, entitled "WIRELESS DATA COLLECTION METHOD SNA DSYSTEMS, SUCH AS FOR RADIO FREQUENCY (RFID) TAGS" (Attorney Docket No. 11041-8286), assigned to the assignee of this application; Association of American Railroads, Mechanical Division, Standard for Automated Equipment Identification, Standard S-918-950 (adopted in 1991 and revised in 1995); product brochures by Echelon Corporation (http://www.echelon.com), including the LonWorks System and "Ep$^{x}$™ Direct Braking and TrainTalk™", published electronically by GE Harris Railway Electronics at www.geharris.com/products/EPXwp.pdf; "TrainTalk™ Wirefree Communications System: A Robust Wireless Communications Specifically Designed for the Railroad Environment" presented to European Rail Research Institute (ERRI) High Productivity Freight and ECP Brake in Europe, Feb. 4–5, 1998, available at www.geharris.com/products/francetraintalk.pdf.

The above description of illustrated embodiments of the invention is not intended to be exhaustive, or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other data collection and communications systems and methods, not necessarily the railway data collection and communications systems described above.

The various embodiments described above can be combined to provide yet further embodiments. All of the above references and U.S. patents and applications are incorporated herein by reference. Aspects of the invention can be modified, if necessary to employ the systems, functions and concepts of the various patents and applications of described above to provide yet further embodiments of the invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of collecting information from a railway train, the method comprising:

for each of a number of railway vehicles coupled together to form at least a portion of the railway train, determining at least one operational characteristic of the railway vehicle; and successively transmitting a message from a respective transmitter carried by each of the successively adjacent railway vehicles, each message including the determined operational characteristic of the transmitting railway vehicle and the determined operational characteristics of each of the previously transmitting railway vehicles.

2. The method of claim 1 wherein determining at least one operational characteristic of the railway vehicle includes:

determining a railway vehicle identifier for the railway vehicle.

3. The method of claim 1 wherein determining at least one operational characteristic of the railway vehicle includes:

determining a wheel out of round condition for the railway vehicle.

4. The method of claim 1 wherein determining at least one operational characteristic of the railway vehicle includes:

determining a wheel bearing condition for the railway vehicle.

5. The method of claim 1 wherein determining at least one operational characteristic of the railway vehicle includes:

determining a weight for the railway vehicle when the railway vehicle is in motion.

6. The method of claim 1 wherein determining at least one operational characteristic of the railway vehicle includes:

determining a cargo status of cargo carried by the railway vehicle.

7. The method of claim 1 wherein determining at least one operational characteristic of the railway vehicle includes:

determining a cargo inventory of cargo carried by the railway vehicle.

8. The method of claim 1 wherein successively transmitting a message from a respective transmitter carried by each of the successively adjacent railway vehicles, includes transmitting from the respective transmitter in each of the railway vehicles in order along a first direction to a last one of the railway vehicles in the railway train.

9. The method of claim 1 wherein successively transmitting a message from a respective transmitter carried by each of the successively adjacent railway vehicles, includes:

transmitting from the respective transmitter in each of the railway vehicles in order along a first direction to a last one of the railway vehicles in the railway train; and transmitting along a second direction, opposite the first direction to a first one of the railway vehicles in the railway train.

10. A method of collecting information from a plurality of vehicles coupled together to form at least a portion of a train of coupled vehicles; the comprising:

successively transmitting a message from a respective transmitter carried by each of the vehicles in an order of the vehicles in the train, each message adding information about the transmitting vehicle to information in the previous message; and storing a final one of the messages, at least temporarily.

11. The method of claim 10, further comprising:

transmitting at least a portion of the final message to a receiver externally located from the train.

12. The method of claim 10, further comprising:

for each of the vehicles, determining at least one operational characteristic of the vehicle.

13. The method of claim 10, further comprising:

transmitting an activation message from a starting one of the vehicles where the starting one of the vehicles is at one end of the train.

14. The method of claim 10, further comprising:

transmitting an activation message from a starting one of the vehicles where the starting one of the vehicles is between a first and a last one of the vehicles in the train.

15. The method of claim 10, further comprising:

transmitting an activation message from a starting one of the vehicles, the activation message including information about the starting one of the vehicles.

16. The method of claim 10, further comprising:

transmitting an activation message from a starting one of the vehicles where the starting one of the vehicles is a locomotive.

17. A method of collecting information from a number of railway vehicles coupled together to form at least a portion of a railway train, the method comprising:

transmitting an activation message from a starting one of the railway vehicles;

in response to the activation message, transmitting a query message from each of the other railway vehicles in a daisy-chain along successively adjacent ones of the railway vehicles, the query messages adding information about the transmitting railway vehicle to information in the previous query messages;

transmitting an answer message from each of the other railway vehicles in a daisy-chain along successively adjacent ones of the railway vehicles from an ending railway vehicle to the starting railway vehicle, the answer messages including information about at least each of the railway vehicles other than the starting railway vehicle.

18. The method of claim 17 wherein the answer message also includes information about the starting railway vehicle.

19. The method of claim 17 wherein the answer message also includes information about the starting railway vehicle.

20. The method of claim 17 wherein the starting railway vehicle is the first railway vehicle in the train.

21. The method of claim 17 wherein the ending railway vehicle is between the first and the last railway vehicles in the train.

22. A railway communications system, comprising:

a master control unit on a starting railway vehicle, the master control unit configured to transmit an activation message to an adjacent railway vehicle along a train;

a first data transmission unit on the railway vehicle adjacent the starting railway vehicle, the first data transmission unit configured to receive the activation message from the master control unit and to transmit a query message to a next adjacent railway vehicle along the train in response, the query message including at least one operating parameter of the adjacent railway vehicle; and a last data transmission unit on an ending railway vehicle, the last data transmission unit configured to receive a query message from a previous data transmission unit on a previously adjacent railway vehicle and to transmit an answer message back to the previously adjacent railway vehicle in response, the answer message including information about at least all of the railway vehicles other than the starting railway vehicle.

23. The method of claim 22 wherein the starting railway vehicle is the first railway vehicle in the train.

24. The method of claim 22 wherein the starting railway vehicle is between the first and the last railway vehicles in the train.

* * * * *